United States Patent [19]

Spevack

[11] Patent Number: 4,788,051
[45] Date of Patent: Nov. 29, 1988

[54] IMPROVEMENTS IN ENRICHMENT SYSTEMS FOR ISOTOPES OF HYDROGEN AND/OR OXYGEN

[75] Inventor: Jerome S. Spevack, New Rochelle, N.Y.

[73] Assignee: Deuterium Corporation, Nev.

[21] Appl. No.: 38,176

[22] Filed: May 8, 1979

Related U.S. Application Data

[62] Division of Ser. No. 712,171, Aug. 6, 1976, Pat. No. 4,221,774.

[51] Int. Cl.$^4$ ............................................. C01B 5/00
[52] U.S. Cl. .................................... 423/579; 422/255; 422/285; 423/580; 423/647.7
[58] Field of Search ................ 422/255, 285; 423/579, 423/580, 648 A

[56] References Cited

U.S. PATENT DOCUMENTS

| | | | |
|---|---|---|---|
| 2,690,379 | 9/1954 | Urey et al. | 423/580 |
| 2,895,803 | 7/1959 | Spevack | 423/580 |
| 3,789,113 | 1/1974 | Thayer | 423/580 |
| 3,888,974 | 6/1975 | Stevens | 423/580 |
| 4,101,645 | 7/1978 | Nitschke et al. | 423/648 A |

Primary Examiner—John Doll
Assistant Examiner—Wayne A. Langel

[57] ABSTRACT

A new combination is disclosed of (I) a process for producing a substance enriched in a desired isotope of hydrogen and/or oxygen from a flow of liquid substance, e.g. water which becomes depleted in its content of said isotope, and (II) replenishing the liquid substance with said isotope by (a) direct contact with a flow of steam from a source external to the process, preferably geothermal steam, and (b) supplying feed flow of the process (I) from the so replenished liquid substance. Modes of improving the various forms of the process which employ dual temperature isotope exchange and their sub-combinations are also disclosed which enable higher temperatures and/or greater tower temperature differentials to be employed at reduced pressure, thus decreasing construction, energy, and other operating costs of the process, by the use in the process of certain hydroxylated and/or carboxylated organic compounds preferably with a minor proportion of water and preferably having in solution an ionizable substance enhancing the isotope exchange.

31 Claims, 2 Drawing Sheets

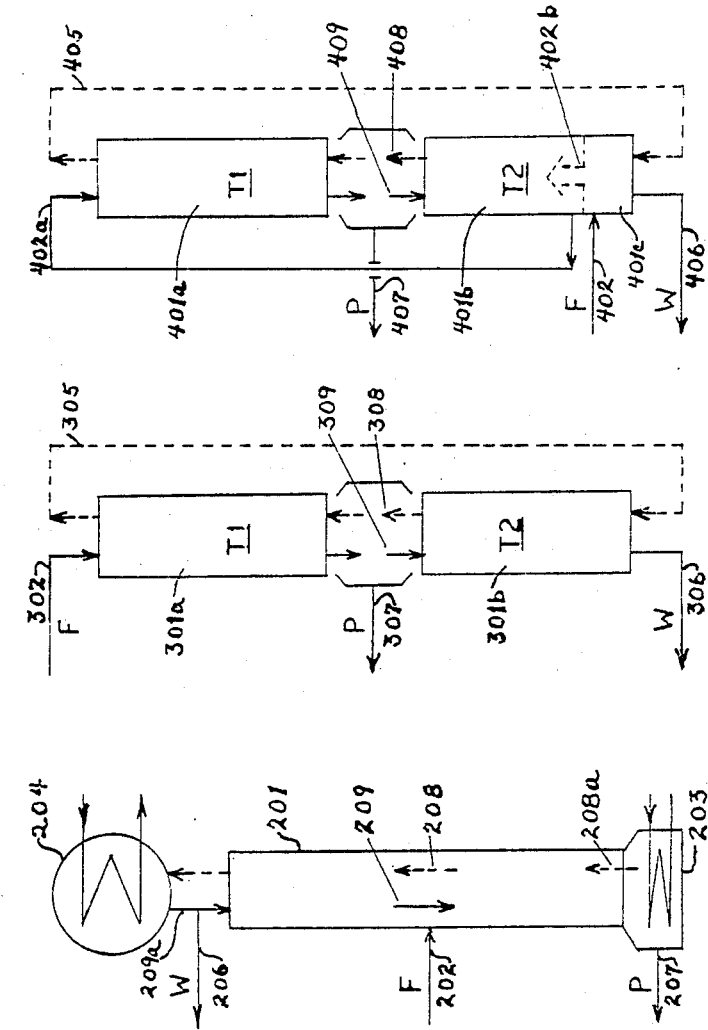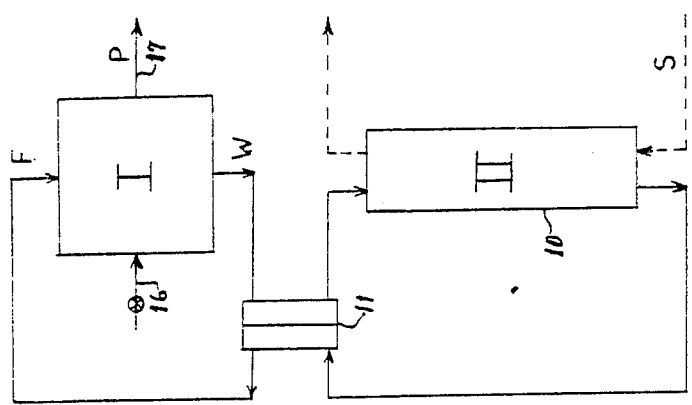

IMPROVEMENTS IN ENRICHMENT SYSTEMS FOR ISOTOPES OF HYDROGEN AND/OR OXYGEN

This is a division of application Ser. No. 712,171, filed Aug. 6, 1976 (now U.S. Pat. No. 4,221,171 issued Sept. 9, 1980).

BACKGROUND OF THE INVENTION (1) Field of the Invention

This invention relates to improvements in isotope concentration systems for producing a substance enriched in desired isotopes of the elements hydrogen and/or oxygen.

(2) State of the Art

It has heretofore been known to produce a substance enriched in the heavy isotope of the element hydrogen having an atomic weight of 2 (i.e. deuterium), and/or in the heavy isotope of the element oxygen having an atomic weight of 18, by means of a two phase countercurrent contact isotope exchange concentrating process employing liquid water to supply the desired isotope and to serve either as one of said phases, or to replenish the isotope in the depleted phase where both of said two phases are other than water. Natural water contains a normal abundance of deuterium at about 1 part to 7,000 parts of protium having an atomic weight of 1 and oxygen-18 at about 1 part to 500 parts of oxygen-16 as well as oxygen-17 at about 1 part to 2,600 parts of oxygen-16. Such processes have accomplished isotope enrichment by reflux distillation, by mono-temperature chemical exchange of the isotopes of the element between a first substance and a reflux of another physically separable substance formed by chemical conversion from the first substance, or by dual temperature exchange of isotopes of the element between two physically separable substances containing said element. In all such processes the hydrogen or oxygen isotope produced has been supplied by liquid water from a natural source. Such knowledge is set forth in the publication "Production of Heavy Water" by George M. Murphy et al, McGraw-Hill Book Company, Inc., 1955, herein incorporated by reference, and hereinafter called "Murphy"; in the publication DP-400, "Production of Heavy Water, Savannah River and Dana Plants, Technical Manual, AEC Research and Development Report, July 1959, herein incorporated by reference and hereinafter called "DP-400"; and in Spevack U.S. Pat. No. 2,787,526, Apr. 2, 1957, U.S. Pat. No. 2,895,803, July 21, 1959, and U.S. Pat. No. 3,860,698, Jan. 14, 1975, herein incorporated by reference, and hereinafter called Spevack U.S. Pat. No. 2,787,526 Spevack U.S. Pat. No. 2,895,803 and Spevack U.S. Pat. No. 3,860,698 respectively.

Since the heavy isotopes of hydrogen and/or oxygen exist only in minor proportions in the isotopic mixtures contained in natural water, all such enrichment processes have required handling of large quantities of water to obtain small quantities of product. As natural water usually contains dissolved mineral solids, its use has required either expensive pretreatment of the water, or the use of costly special equipment, construction, and/or materials, and/or processing, to cope with the problems incident thereto. Also, in the water-hydrogen sulfide dual temperature isotope exchange process for production of heavy water, as well as in other isotope enrichment processes utilizing valuable or hazardous water soluble substances, costly treatment of the waste streams of isotope depleted liquid water has been required to prevent loss of such substances and/or to avoid environmental pollution.

SUMMARY OF THE INVENTION

The present invention has for a principal object the inhibition or elimination of various of the aforesaid problems and the provision of a system in which both phases of the countercurrent contact isotope exchange concentration process are recycled continuously and an isotope depleted liquid phase substance thereof has its prior content of the desired isotope of hydrogen and/or oxygen replenished in an isotope regenerator by direct contact isotope exchange with a flow of steam from a source external to the concentrating process, whereby such replenished liquid serves as the feed liquid for the concentration process. As said supply of steam is gaseous, all problems incident to mineral solids in solution in liquid water are eliminated. As the said elevated temperature corresponds to that of the steam, the isotope replenishment of the process feed liquid therefrom may be conducted without materially altering the characteristics of the steam for use as an energy source in any other system. The steam provided for isotope replenishment may be produced in a conventional steam boiler using a surface water supply or it may be naturally formed geothermal steam which is produced subteraneously at high temperature and pressure from water far below the surface of the earth and contains higher proportions of the heavy isotopes of its elements than does steam from surface water. The applicant has conceived that the natural high temperature of geothermal steam and its content of higher proportions of the heavy isotopes of hydrogen and/or oxygen can, individually or collectively, advantageously be employed in accordance with the present invention to provide improved systems for concentrating deuterium and/or oxygen-17 and oxygen-18, with essentially no detriment to the ability of the geothermal steam to usefully serve as a source of energy. In addition, geothermal steams usually contain as contaiminants hydrogen sulfide, and other gaseous components, which may be separated from the steam either before or after its use as an isotope feed source in accordance with the present invention, e.g. as by processes of my copending application Ser. No. 712,170 (now U.S. Pat. No. 4,123,506 issued Oct. 31, 1978) and Ser. No. 712,172 (now U.S. Pat. No. 4,218,431 issued Aug. 19, 1980) both filed concurrently with the parent of the present application and therein and herein incorporated by reference.

In certain aspects of the invention the flow of liquid substance from the isotope concentration system depleted in the desired isotope of hydrogen and/or oxygen is liquid water, and said liquid water is passed in an isotope regenerator in countercurrent direct contact with the steam at the temperature and pressure of saturated steam existing therein. In other aspects of the invention the said flow of liquid substance circulating through the isotope concentration system and the isotope regenerator may be comprised of one or more substances from the group consisting of water miscible hydroxylated and/or carboxylated organic compounds having vapor pressures substantially less than that of water at the temperature in said isotope regenerator, and/or of aqueous solutions of such organic compounds. In preferred embodiments, such compounds have a ratio of carbon atoms to alcoholic and/or acidic hydroxyl groups not greater than 2 and are employed as an aqueous solution containing a minor molar proportion of water. In preferred embodiments the withdrawn stream of isotope enriched product is preferably a stream of liquid water enriched in the desired isotope. The flow of liquid is passed through the isotope concentration system and the isotope regenerator in essentially a closed circulation and a quantity of water, preferably distilled water, equal to the molar quantity of said product stream is added to said circulation. Said added quantity of water is preferably supplied by adjusting the temperature of the liquid entering the isotope regenerator to a value sufficiently below the temperature of the steam therein to effect condensation in the regenerator of a molar quantity of water equivalent to the molar quantity of water removed as product.

Further objects of the present invention are to condition the isotope impoverished liquid substance from the isotope concentration system, which is to be replenished by contact with a flow of steam and recirculated in said system, for cooperation with such steam with no material detriment to the steam as an energy source.

Other objects of this invention are to provide novel dual temperature isotope concentrating systems employing gaseous and liquid exchange fluids which are capable of operating at greater hot-cold tower temperature differentials and/or at higher hot tower temperatures with lower pressure requirements than are necessary with the exchange fluids employed in the prior art systems, thereby effecting substantial savings in heating, cooling and pressure equipment, heating and cooling energy, and other operating costs, as well as increased productivity of the isotope concentration system as compared to the prior art systems.

The invention will be more readily understood from the following description of preferred embodiments thereof, which are to be deemed illustrative and not restrictive of the invention, the scope of which is pointed out in the appended claims.

SHORT DESCRIPTION OF THE DRAWINGS

In the accompanying drawings of such preferred embodiments, in which conventional pumps, heaters, coolers and valves are largely omitted for clarity:

FIG. 1 is a diagram showing in combination a hydrogen and/or oxygen isotope concentrating system (I) having a liquid feed, e.g. water, and a feed isotope regenerator (II) supplied with steam (S), preferably from a geothermal source, the isotope impoverished liquid (W), e.g. water, which has been discharged from the concentrator (I), being passed in countercurrent contact isotope exchange in the feed isotope regenerator (II) to replenish its supply of the desired isotope and then being returned as the liquid feed (F) to the isotope concentrating system (I);

FIGS. 2, 3 and 4 are diagrams illustrative but not restrictive of various forms of hydrogen and/or oxygen isotope concentrators (I) employable in FIG. 1;

FIG. 2 being illustrative of the fractional distillation and the mono-thermal isotope exchange types and FIGS. 3 and 4 being illustrative of two forms of dual temperature isotope exchange systems; and FIGS. 5 and 6 are diagrams of modifications of FIG. 1 including stripping elements for removing dissolved volatile components from the liquid discharge(W), e.g. water containing dissolved hydrogen sulfide, passing from the concentrator (I) to the feed isotope regenerator (II).

DETAILED DESCRIPTION

Figure 5:
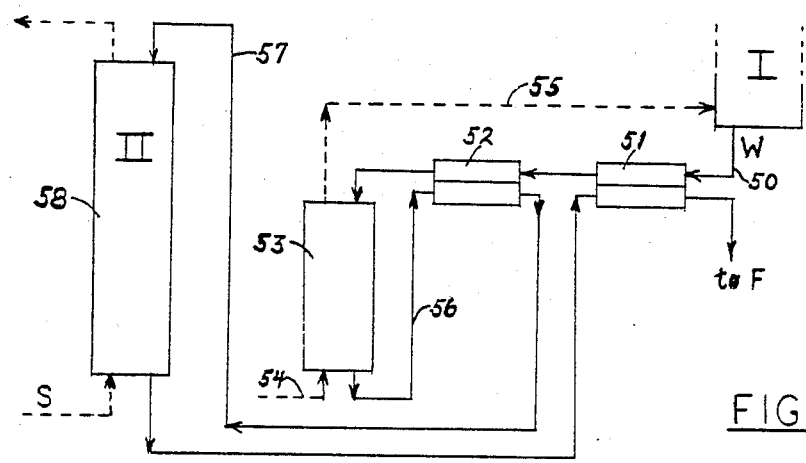

In the arrangement of FIG. 1, the element (I) may be an isotope concentration system of any suitable form. When element (I) has the form indicated in FIG. 2, it comprises a two phase, e.g. liquid and gas, countercurrent contactor 201 provided with a liquid feed (F) via 202, with phase changing devices 203 and 204 at its opposite ends, and with a discharge (W) via 206 for liquid depleted in the desired isotope and a discharge via 207 for product liquid (P) enriched in the desired isotope, or vice versa where the desired isotope concentrates in the gaseous phase.

When the system of FIG. 2 is a conventional water distillation system it is preferably operated at subatmospheric pressure and the phase conversion element 203 may be a boiling device whereby water vapor 208a is generated from liquid in 203 for passage through the contactor 201 countercurrent to a flow of liquid water 209 therethrough, and the phase conversion element 204 may be a condensing device whereby liquid water 209a is condensed from water vapor in 204 for passage through the contactor 201 countercurrent to the flow of water vapor 208 therethrough to be joined therein with the feed flow (F) supplied via 202. With this system, the light isotopes of hydrogen and/or oxygen accumulate in the vapor condensed to water at 204, and the desired heavy isotopes of hydrogen and/or oxygen accumulate in the liquid water phase at 203, the product water (P) and the depleted water (W) being withdrawn from said opposite ends, respectively, in appropriate quantities.

When the system of FIG. 2 is a mono-temperature concentrating system, e.g. a water/hydrogen isotope exchange system, the feed (F) is liquid water containing the desired isotope, the phase converter 203 may be an electroyzing device for decomposing the water into hydrogen and oxygen gases, the gaseous component containing the desired isotope is passed as indicated at 208 through the countercurrent contact tower 201 in the presence of a suitable isotope exchange catalyst, and the phase converter 204 may be a burner in which the said component 208 and a supply of oxygen and/or hydrogen, as required, are recombined by combustion to form liquid water to flow as indicated at 209 in said countercurrent contactor 201.

When the element (I) of FIG. 1 is a dual temperature isotope exchange concentrator of deuterium of the type exemplified in FIG. 3, having a cold exchange tower 301a and a hot exchange tower 301b, the feed liquid water (F) containing a normal abundance of deuterium is supplied as at 302 to the top of the cold tower 301a where it passes in countercurrent contact with a flow 305 of circulating auxiliary fluid, e.g. hydrogen sulfide, and becomes enriched in deuterium as it passes through said cold tower. Said enriched liquid is then heated in the region between the two exchange towers to the temperature of the hot tower 301b and passed through said tower 301b in countercurrent contact with said flow 305 and becomes depleted in deuterium in passing through said hot tower, and is discharged from the hot tower as deuterium depleted water (W) at 306. Product from the illustrated dual temperature stage of a cold tower and a hot tower, or of any subsequent deuterium concentrating system of the same or any different type indicated by the brackets between the elements 301a and 301b, may be water enriched in the desired isotope (P) delivered as at 307.

In the dual temperature isotope exchange concentrator of deuterium of the type exemplified in FIG. 4, the elements of the system which are essentially the same as those of FIG. 3 are indicated by like reference numerals raised by 100. When the isotope concentration system (I) of FIG. 1 is of the FIG. 4 type, the feed liquid water (F) containing deuterium is supplied as at 402 to the lower or feed section 401c of the hot exchange tower 401b–401c, and the cold exchange tower 401a and upper section 401b of said hot exchange tower are provided with an essentially closed circulation of liquid water 402a isolated from said feed section by seal tray 402b, which allows upward flow 405 of gas through the hot tower 401b–401c but prevents downward flow of liquid into 401c. The feed (F), delivered to the feed section via 402, is contacted with the flow 405 of circulating auxiliary fluid, e.g. hydrogen sulfide gas, and discharged from said feed section at (W) via 406.

When any of the known or herein disclosed isotope concentrating systems exemplified by FIGS. 2, 3 and 4, or any other type of system having a liquid feed (F), a liquid discharge (W) and a product stream (P), is combined in the arrangement of FIG. 1, the discharge (W), adjusted to approximately the temperature of the steam (S), is passed in countercurrent contact therewith in the feed isotope regenerator (II) shown as a gas and liquid contact device 10 and then, after appropriate temperature adjustment, is returned to the feed liquid (F) inlet to the concentrating system (I). In the form shown in FIG. 1 the temperature adjustments are at least in part effected by regenerative indirect contact heat transfer as by heat exchanger 11, and additional heating or cooling is supplied as needed in any suitable manner, as from an external source, to attain the temperature of feed supply (F) of the particular concentrating system (I) employed in the combination.

The product fluid (P), which may be a liquid or a gas enriched in the desired isotope, is discharged from the concentrating system (I) as at 17, and a like molar quantity of make-up of the same fluid not so enriched is supplied to the concentrating system (I) as via 16, which in FIGS. 2 and 3 may also enter the system (I) along with the feed supply (F) and in FIG. 4 may be added in suitable manner to the circulation 402a.

When the liquid substance (W) discharged from concentrator (I) contains dissolved therein a content of the auxiliary fluid exchange substance, i.e. 208, 305 or 405, it is usually desirable to prevent loss of such exchange substance from the concentrating system (I). In the arrangement of FIG. 1 and when such exchange substance is volatile, if the liquid (W) containing such volatile exchange substance were delivered into contact with the steam (S) in isotope regenerator (II), the steam would strip such volatile substance from the liquid (W) and carry it along with the steam with consequent economic and/or environmental disadvantage.

In the embodiment of the invention illustrated in FIG. 5, the concentrator (I) from which the liquid (W) is discharged is operated at a temperature and pressure $T_1P_1$ and the liquid (W) with its content of strippable exchange substance (e.g. hydrogen sulfide), after being heated by being passed via 50 through indirect contact heat exchangers 51 and 52, is delivered to stripper 53 where it is stripped by steam 54 at a temperature and pressure $T_2P_2$, said pressure $P_2$ being approximately the same as said pressure $P_1$. The stripped out volatile components and the residue of the stripping steam are passed via 55 to an appropriate location in the concentrator (I), e.g. to the bottom of the hot tower in the systems of FIGS. 3 and 4. The liquid which has been stripped in the stripper 53 is then passed via 56 to indirect contact heat exchanger 52, in which it gives up heat countercurrently by indirect contact to the liquid (W) from 51, passed thereinto as aforesaid, and is then passed via 57 to isotope regenerator (II) shown as a contact tower 58, wherein it passes in countercurrent direct contact isotope exchange with the flow of steam (S). After said passage in 58 the isotope replenished liquid, at substantially the temperature $T_3$ and pressure $P_3$ of the saturated steam in 58, is delivered via 59 through the heat exchanger 51 where it gives up head counter-currently by indirect contact to the liquid (W) from (I) and forms the feed liquid (F) to a concentrator (I). This arrangement is particularly desirable when the temperature $T_3$ in the isotope regenerator (II) at 58 is less than the temperature $T_2$ in the stripper 53, which temperature $T_2$ is greater than the temperature of the liquid (W) leaving the concentrator (I), and in the preferred embodiment the pressure $P_3$ in 58 is less than the pressure $P_2$ in 53 and about the same as the pressure $P_1$ in the concentrator (I).

Figure 6:
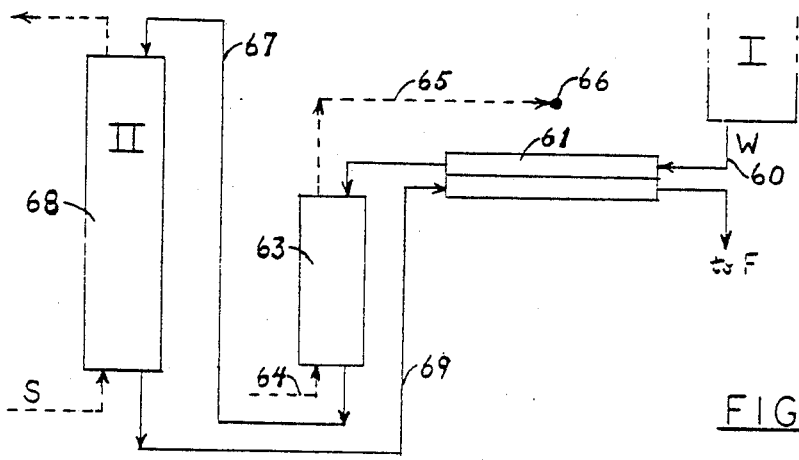

In the embodiment of the invention illustrated in FIG. 6, the concentrator (I) from which the liquid (W) is discharged is operated at a temperature and pressure $T_1P_1$, and the liquid (W) with its content of dissolved stippable exchange substance (e.g. hydrogen sulfide), after being heated by being passed via 60 through indirect contact heat exchanger 61, is delivered to stripper 63 where it is stripped by steam 64 at a temperature and pressure $T_2P_2$, said pressure $P_2$ being less than said pressure $P_1$. The stripped out volatile components and the residue of stripping steam are passed via 65 to a point of use 66, which with pressure adjustment may be an appropriate location in the concentrator (I). The liquid which has been stripped in the stripper 63 is then passed via 67 to isotope regenerator (II) shown as a contact tower 68, wherein it passes in countercurrent direct contact isotope exchange with the flow of steam (S). After said passage in 68 the isotope restored liquid, at substantially the temperature $T_3$ and pressure $P_3$ of the saturated steam in 68, is delivered via 69 through the heat exchanger 61 where it gives up heat by countercurrent indirect contact to the liquid (W) from (I) and forms the feed liquid (F) to the concentrator (I). This arrangement is particularly desirable when the temperature $T_3$ in the isotope regenerator (II) at 68 is about the same as the temperature $T_2$ in the stripper 63, which temperature $T_2$ is greater than the temperature of the liquid (W) leaving the concentrator (I), and in the preferred embodiment the pressure $P_3$ in 68 is about the same as the pressure $P_2$ in 63 and less than the pressure $P_1$ in the concentrator (I).

In the system of FIG. 2, the desired isotope of hydrogen and/or oxygen may be concentrated, depending on the constituents of the two phases 208 and 209. For example, employing water distillation it is possible to simultaneously concentrate the heavy isotopes of both elements oxygen and hydrogen in 203, and to withdraw the lighter isotopes of both said elements simultaneously at 206. In a decomposition/recombination system as above described, employing an appropriate catalyst system in 201, the heavy isotopes of both elements oxygen and hydrogen may be concentrated in 203 simultaneously and their lighter isotopes may be concentrated at 206.

In the systems of FIGS. 3 and 4 it is possible to simultaneously concentrate the heavy isotopes of both elements hydrogen and oxygen, as at 307 or 407, and their lighter isotopes, as at 306 or 406, by employing as the circulating auxiliary fluid, i.e. 305 or 405, one or more substances capable of exchanging the isotopes of hydrogen and oxygen, e.g. a gas phase comprising a mixture of hydrogen sulfide and carbon dioxide, with a suitable liquid phase, e.g. liquid water, a water miscible hydroxylated and/or carboxylated organic compound, or mixture thereof, as the countercurrent isotope exchanging phase.

When concentrating deuterium in a system as exemplified in FIGS. 3 or 4, utilizing hydrogen sulfide as the gaseous exchange phase; or when concentrating the heavy isotopes of oxygen, particularly $O^{18}$, in such a system, utilizing carbon dioxide ($CO_2$) or sulfur dioxide ($SO_2$) as the gaseous phase; or when concentrating deuterium and heavy oxygen isotopes utilizing a mixture of hydrogen sulfide and $CO_2$ as the gaseous phase, the present invention has shown that considerable advantage may be obtained by utilizing as a liquid phase an aqueous solution comprising water, in minor molar proportion, and a water miscible organic compound, in major molar proportion, said water miscible compound being selected from the class consisting of the water miscible hydroxy and/or carboxy compounds having a ratio of carbon atoms to their alcoholic and acidic hydroxyl groups not greater than 2. Such preferred compounds include, among those having a C/OH ratio of 1, ethylene glycol, glycerol, and glyceric acid; among those having a C/OH ratio of 1.5, propylene glycol and trimethylene glycol; and among those having a C/OH ratio of 2, butylene glycol, tetramethylene glycol and 2,3-butanediol. To minimize the quantity of inert constituents handled, compounds having a C/OH ratio of 1 are preferred, compounds having a C/OH ratio of 1.5 are next preferred.

Since the dual temperature process operates one of its towers at a high temperature, the pressure therein is governed not only by the pressure of the gaseous phase, e.g. $H_2S$, $SO_2$, $CO_2$, and $H_2S + CO_2$, but additionally by the vapor pressure of the liquid phase at that temperature. Thus in the conventional systems employing only water as the liquid exchange medium, at the hot tower temperature, e.g. 130° C., the vapor pressure of the water is approximately 40 p.s.i.a. which adds to the pressure of the gas, e.g. $H_2S$, employed in the system, and since such gas being supplied to the hot tower comes from the cold tower it is cold and relatively dry and therefore must not only be heated to the hot tower temperature but must also be humidified with water vapor to include the partial pressure of the water vapor at the hot temperature, requiring substantial energy and equipment with consequent expense.

Furthermore, on passing from the hot tower to the cold tower, the gas phase must not only be cooled but must also be dehumidified to remove the quantity of water added as vapor thereto in the aforesaid humidification, requiring the extraction of substantial energy and the utilization of substantial amounts of cooling water and equipment with consequent expense.

By the present invention, which substitutes one or more of the described organic compounds for a major proportion of the water, the partial pressure exerted by the liquid phase, which must be provided and maintained in the gaseous phase of the hot tower, is greatly reduced with consequent substantial savings in equipment, energy and operating costs.

In the preferred embodiments of the present invention, e.g. using a major proportion of glycerol and/or glycol in the liquid phase, the partial pressure exerted by the liquid solution at 130° C. is reduced approximately in direct proportion to the content of the organic compound, since the vapor pressure of glycerol and ethylene glycol are substantially negligible compared to that of water at that temperature, i.e. about 1 mm for glycerol and about 60 mm for ethylene glycol, as compared to about 2,000 mm for pure water. Thus a liquid phase of 75 molar percent of glycerol and 25 molar percent water at 130° C. exerts only about 500 mm water vapor pressure, i.e. about ¼th that of pure water; and a liquid phase of glycerol containing only one molar percent water exerts a water vapor pressure of only about 20 mm, i.e. about 1/100th that of pure water at that temperature.

In the present invention, the presence of some water in the principally organic liquid phase facilitates the isotope exchange between the gaseous and liquid phases.

The parameters incident to the design of isotope concentration systems of the types illustrated by FIGS. 2, 3, and 4 are well known to the art and, as above indicated, the isotope replenishing element (II) may be operated at a temperature and pressure appropriate to the source of steam supply without material detriment to the steam's utility as an energy source for another system, and when the water miscible organic hydroxylated and/or carboxylated compounds are employed in the practice of the present invention, the same temperature parameters may be employed at lower system pressures or higher temperature parameters and/or higher hot-cold temperature differentials may be employed without increasing the system's pressure.

Also in practicing the present invention the isotope exchange between the gas and liquid phases may be further enhanced by including in the liquid solution a small proportion, e.g. 10 to 1000 ppm based on the water present, of the products formed by reaction, in situ or otherwise, of the acidic exchange substance constituting the gaseous phase with an alkali metal base and/or an organic amine forming with such acidic substance a water soluble salt relatively non-volatile at the temperature of the isotope regenerator (II). Typical additives known to the art for use in hydrogen sulfide/water systems are disclosed in my Canadian Pat. No. 670,454, issued Sept. 17, 1963 herein incorporated by reference. Like additives may be used in combinations of the present invention when carbon dioxide is employed, with the requirement that the carbonate reaction product formed be relatively non-volatile and water soluble.

While there have been described herein what are at present considered preferred embodiments of the invention, it will be obvious to those skilled in the art that modifications, including changes, omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be included therein.

Subject matter of the pressure invention is set forth in the confidential disclosure accompanying applicant's petition for license under 35 USC 185, No. P-38,919 filed in the Patent Office on Jan. 24, 1975, referred for review by the AEC in accordance with 35 USC (1952) Section 181, and accorded License for foreign filing No. 382,045 on Feb. 6, 1975.

I claim:

1. A process for producing from a flow of steam from a source external to the process which flow contains initial concentrations of a desired heavy isotope and of another lighter isotope of the same element, said element being of the group of elements consisting of hydrogen and oxygen, a substance enriched in said desired isotope without materially affecting the utility of the steam as a source of energy, which process comprises in combination:
    (a) providing at substantially the temperature of said flow of steam a flow of liquid to step (b) containing said isotopes of said element and containing a lesser concentration of said desired isotope than said initial concentration thereof,
    (b) extracting desired isotope from said flow of steam by passing said flow of liquid from step (a) in direct contact countercurrent isotope exchange with said flow of steam for increasing the quantity of said desired isotope in said flow of liquid to a concentration approaching said initial concentration thereof with corresponding increase of said other isotope in the steam,
    (c) further processing said flow of liquid contacted in step (b) to produce therefrom a flow of substance enriched in said desired isotope and to cause said flow of liquid to become depleted in said desired isotope to said lesser concentration thereof,
    (d) recirculating to step (a) the depleted flow of liquid from said processing in step (c),
    (e) withdrawing substance enriched in said desired isotope from step (c), and
    (f) withdrawing the steam contacted in step (b) and delivering it for use as a source of energy.

2. A process as claimed in claim 1, wherein the substance enriched in the desired isotope in step (c) is water which is withdrawn in step (e), and water not so enriched is supplied to the flow of liquid in step (c).

3. A process as claimed in claim 1, wherein the substance enriched in the desired isotope in step (c) is water which is withdrawn in step (e), and condensate from said flow of steam is supplied to the flow of liquid in step (c).

4. A process as claimed in claim 1, wherein step (c) and step (b) are effected at different pressures.

5. A process as claimed in claim 4, wherein step (b) is effected at a higher pressure than step (c).

6. A process as claimed in claim 4, wherein step (b) is effected at a lower pressure than step (c).

7. A process as claimed in claim 1, wherein step (c) and step (b) are effected at different temperatures.

8. A process as claimed in claim 7, wherein step (b) is effected at a higher temperature than step (c).

9. A process as claimed in claim 7, wherein step (b) is effected at a lower temperature than step (c).

10. A process as claimed in claim 1, wherein the substance produced is enriched in the deuterium isotope of the element hydrogen.

11. A process as claimed in claim 1, wherein the substance produced is enriched in the $O^{18}$ isotope of the element oxygen.

12. A process as claimed in claim 1, wherein the substance produced is enriched in both the deuterium isotope of the element hydrogen and the $O^{18}$ isotope of the element oxygen.

13. A process as claimed in claim 1, wherein the said liquid substance consists essentially of one or more liquid chemical compounds selected from the group consisting of water and the water miscible hydroxylated and/or carboxylated organic compounds having vapor pressures less than that of water at the temperature of step (b).

14. A process as claimed in claim 13, wherein the liquid substance employed comprises water.

15. An improved process as claimed in claim 1 for producing a substance enriched in at least the deuterium isotope of the element hydrogen, wherein step (c) is effected by dual temperature isotope exchange between said feed flow of liquid substance and an auxiliary exchange substance comprising aqueous hydrogen sulfide, and which further comprises:
    (c) removing substantially all dissolved hydrogen sulfide from the flow of liquid substance from step (c) before it is subjected to step (b).

16. An improved process as claimed in claim 15, wherein said auxiliary exchange substance contains both hydrogen sulfide and carbon dioxide, and the substance produced is also enriched in the $O^{18}$ isotope of the element oxygen, and said step (c) further comprises also removing dissolved carbon dioxide from the flow of liquid substance from process (I) before it is subjected to step (a).

17. A process as claimed in claim 1, wherein step (c) is effected by a countercurrent isotope exchange process at a lower temperature than that at which step (b) is effected, and which further comprises:
    (g) passing the said liquid flows from step (c) into direct contact heat exchange relation to each other, for causing the temperature of said flow of depleted liquid from step (c) to approach the temperature of step (b) and causing the temperature of said flow of contacted liquid from step (b) to approach the temperature of said flow of depleted liquid from step (c).

18. A process as claimed in claim 1, wherein step (c) is effected by dual temperature isotope exchange between said flow of liquid and an auxiliary exchange fluid substance at lower temperature than that at which step (b) is effected and which further comprises:
    (g) passing the said liquid flows from step (c) and step (b) into indirect contact heat exchange relation to each other, for causing the temperature of said flow of depleted liquid from step (c) to approach the temperature of step (b) and causing the temperature of said flow of contacted liquid from step (b) to approach the temperature of said flow of depleted liquid from step (c).

19. An improved process as claimed in claim 18, wherein said liquid flow from said process (I) contains dissolved therein a quantity of said auxiliary exchange substance which quantity is substantially stripped from said liquid and returned to said process (I), and which further comprises:
    (d) effecting said stripping prior to said contact with said flow of steam in said step (a).

20. An improved process as claimed in claim 19, in which said stripping is effected at a temperature higher than the temperature of said liquid flow from said process (I).

21. An improved process as claimed in claim 20, in which the temperature at which said stripping is effected is also higher than the temperature at which said step (a) is effected, and which further comprises:
(e) subjecting the liquid effluent from said stripping step to only a part of said indirect contact heat exchange before being subjected to said step (a); and
(f) subjecting said liquid from said step (a) to the remainder of said indirect contact heat exchange before its return to said process (I).

22. An improved process as claimed in claim 20, wherein the temperature at which said stripping is effected is essentially the same as the temperature at which said step (a) is effected and which further comprises:
(e) subjecting to said step (a) the liquid effluent from said stripping step before passing it in said indirect contact heat exchange with the liquid from said process (I).

23. An improved process as claimed in claim 1, wherein said flow of steam is from a subterranean water source and is geothermal steam.

24. An improved process as claimed in claim 1, wherein said flow of steam to said step (a) is essentially free of molecular oxygen and contains two or more gaseous components from the class consisting of hydrogen sulfide ($H_2S$), carbon dioxide ($CO_2$), ammonia ($NH_3$), methane ($CH_4$), hydrogen ($H_2$), nitrogen ($N_2$) and the rare gas elements, which further comprises:
(c) removing one or more of said gaseous components in major part before the direct contact of said step (a).

25. An improved process as claimed in claim 1, wherein said flow of steam to said step (a) is essentially free of molecular oxygen and contains two or more gaseous components from the glass consisting of hydrogen sulfide ($H_2S$), carbon dioxide ($CO_2$), ammonia ($NH_3$), methane ($CH_4$) hydrogen ($H_2$), nitrogen ($N_2$) and the rare gas elements, which further comprises:
(c) removing one or more of said gaseous components in major part after the direct contact of said step (a).

26. A process as claimed in claim 17, wherein said countercurrent isotope exchange process is reflux distillation.

27. A process as claimed in claim 17, wherein said countercurrent isotope exchange process is mono-temperature isotope exchange.

28. A process as claimed in claim 1, wherein said flow of steam to step (b) contains gaseous components from the class consisting of carbon dioxide ($CO_2$), ammonia ($NH_3$), methane ($CH_4$), hydrogen ($H_2$), nitrogen ($N_2$) and the rare gas elements, which further comprises:
(g) removing one or more of said gaseous components in major part before the direct contact of step (b).

29. Isotope extracting and concentrating apparatus comprising in combination: (I) an isotope concentrator, (II) an isotope regenerator, and (III) feed means interconnecting the same;
said isotope concentrator having (a) means for concentrating in a substance a desired isotope of at least one element selected from the group consisting of hydrogen and oxygen, and for delivering therefrom said substance enriched in said desired isotope, (b) a feed liquid inlet for supplying feed liquid containing said desired isotope thereto, and (c) a depleted liquid outlet for delivering liquid depleted in said desired isotope therefrom;
said isotope regenerator having (a') a direct contact countercurrent gas/liquid contactor, (b') supply liquid inlet means for supplying liquid thereto, (c') contacted liquid outlet means for delivering liquid therefrom, (d') steam inlet means for delivering thereto feed steam from an external source having a content of said desired isotope, and (e') steam outlet means for delivering therefrom steam depleted in said content of desired isotope; and
said feed means comprising (a'') first conduit means for delivering liquid from said depleted liquid outlet to said supply liquid inlet means, and (b'') second conduit means for recirculating liquid from said contacted liquid outlet means to said feed liquid inlet;
whereby steam from an external source containing said desired isotope is depleted in said isotope by transfer thereof to a liquid in said isotope regenerator, which liquid supplies said desired isotope for concentration in said substance by said isotope concentrator and is recycled to said isotope regenerator.

30. Apparatus as claimed in claim 29, wherein said liquid depleted in the desired isotope delivered from said depleted liquid outlet has gas dissolved therein and said feed means further comprises means for removing substantially all of said dissolved gas from the liquid passing therethrough.

31. Apparatus as claimed in claim 29, wherein the temperature of the depleted liquid delivered from said liquid outlet is different from that of the liquid delivered from said contacted liquid outlet means, and said feed means further comprises indirect contact heat exchange means for transferring heat between the liquid passing through said first conduit means and the liquid passing through said second conduit means.

* * * * *